US010018163B2

(12) United States Patent
Benajes Calvo et al.

(10) Patent No.: US 10,018,163 B2
(45) Date of Patent: Jul. 10, 2018

(54) EGR VALVE ASSEMBLY

(71) Applicant: GM GLOBAL TECHNOLOGY OPERATIONS LLC, Detroit, MI (US)

(72) Inventors: Jesús Vicente Benajes Calvo, Valencia (ES); José María Desantes Fernández, Valencia (ES); Pedro Piqueras Cabrera, Valencia (ES); José Ramón Serrano Cruz, Valencia (ES); Joaquin De La Morena, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 15/136,203

(22) Filed: Apr. 22, 2016

(65) Prior Publication Data

US 2016/0312746 A1 Oct. 27, 2016

(30) Foreign Application Priority Data

Apr. 23, 2015 (GB) .................................. 1506979.2

(51) Int. Cl.

*F02B 33/44* (2006.01)
*F16K 1/22* (2006.01)
*F16K 3/08* (2006.01)
*F02M 26/70* (2016.01)
*F02M 26/06* (2016.01)

(52) U.S. Cl.

CPC ............ *F02M 26/70* (2016.02); *F02M 26/06* (2016.02)

(58) Field of Classification Search

CPC ............................... F02M 26/70; F02M 26/06
USPC ........ 60/605.2; 251/305; 137/165.31, 625.31
See application file for complete search history.

(56) References Cited

U.S. PATENT DOCUMENTS

| | | | | |
|---|---|---|---|---|
| 3,938,330 A * | 2/1976 | Nakajima | F01N 13/10 | 60/282 |
| 3,960,177 A * | 6/1976 | Baumann | F16K 1/222 | 137/625.31 |
| 4,259,935 A * | 4/1981 | Watanabe | F02M 19/00 | 137/895 |
| 5,465,756 A * | 11/1995 | Royalty | F16K 1/222 | 137/625.31 |
| 6,076,499 A | 6/2000 | Klumpp | | |
| 6,299,130 B1 | 10/2001 | Yew et al. | | |
| 6,824,119 B2 * | 11/2004 | Conley | F16K 1/222 | 251/305 |

(Continued)

FOREIGN PATENT DOCUMENTS

| | | |
|---|---|---|
| DE | 102004021212 A1 | 11/2005 |
| DE | 102006017148 A1 | 10/2007 |

(Continued)

OTHER PUBLICATIONS

Great Britain Patent Office, Great Britain Search Report for Great Britain Application No. GB1506979.2, dated Oct. 12, 2015.

*Primary Examiner* — Thai Ba Trieu
(74) *Attorney, Agent, or Firm* — Lorenz & Kopf, LLP

(57) ABSTRACT

An EGR valve assembly includes an intake gas passage, an exhaust gas passage, an outlet passage, a movable intake gas flap for changing an effective cross section of the intake gas passage and a movable exhaust gas flap for changing an effective cross section of the exhaust gas passage. The intake gas flap includes at least one channel connecting an inlet port on a upstream-side surface of the flap with an outlet port on a downstream-side surface of the flap.

20 Claims, 1 Drawing Sheet

(56) References Cited

U.S. PATENT DOCUMENTS

| | | | | |
|---|---|---|---|---|
| 7,520,273 | B2 * | 4/2009 | Freitag | F02M 26/06<br>60/605.2 |
| 7,617,678 | B2 * | 11/2009 | Joergl | F02M 26/06<br>60/605.2 |
| 8,196,404 | B2 * | 6/2012 | Onishi | F02M 26/06<br>60/605.2 |
| 8,220,443 | B2 * | 7/2012 | Murata | F02M 26/06<br>60/605.2 |
| 8,453,446 | B2 * | 6/2013 | Onishi | F02M 26/06<br>60/605.2 |
| 8,701,637 | B2 * | 4/2014 | Elsasser | F02M 26/06<br>60/605.2 |
| 9,032,931 | B2 | 5/2015 | De Almeida et al. | |
| 2008/0216802 | A1 | 9/2008 | Hamadani et al. | |
| 2011/0030342 | A1 | 2/2011 | Herges | |
| 2016/0281651 | A1 * | 9/2016 | Hashimoto | F02M 26/41 |

FOREIGN PATENT DOCUMENTS

| | | | | |
|---|---|---|---|---|
| DE | 102011079742 | A1 | 1/2013 | |
| DE | 102012110590 | A1 * | 5/2014 | F02M 26/21 |
| EP | 2412960 | A1 * | 2/2012 | F02M 26/68 |
| JP | 2000008970 | A | 1/2000 | |
| KR | 20120015553 | A | 2/2012 | |

* cited by examiner

EGR VALVE ASSEMBLY

CROSS-REFERENCE TO RELATED APPLICATION

This application claims priority to Great Britain Patent Application No. 1506979.2, filed Apr. 23, 2015, which is incorporated herein by reference in its entirety.

TECHNICAL FIELD

The present disclosure pertains to an exhaust gas recirculation ("EGR") valve assembly, an internal combustion engine including the EGR valve assembly and a car including the internal combustion engine.

BACKGROUND

According to conventional EGR systems, it is known to recirculate exhaust gas from an internal combustion engine into an intake gas flow of the engine. The exhaust gas flow can be variably controlled by a movable exhaust gas flap arranged within an exhaust gas passage of an EGR valve assembly.

In order to induce a variable pressure drop within the intake gas flow allowing recirculation of the exhaust gas, there is provided a movable intake gas flap within an intake gas passage of the EGR valve assembly. The intake gas flap may induce a disturbance within the intake gas flow, which disadvantageously may deteriorate the performance of the internal combustion engine. In particular, formation of water condensate may disadvantageously be increased which in particular may impair a compressor of a turbocharger.

SUMMARY

In one aspect the present disclosure provides improved performance of an internal combustion engine with an EGR system. An EGR ("Exhaust Gas Recirculation") valve assembly includes an intake gas, in particular intake air, passage, an exhaust gas passage and an outlet passage. According to one embodiment the passages are formed within or by a housing respectively. The valve assembly includes a movable intake gas flap for, in particular continuously and/or variably, changing or adjusting an effective cross section of the intake gas passage respectively. In other words, the intake gas flap is movable or adjustable respectively between a most-open or fully open position providing a maximum open cross section of the intake gas passage, and a most-closed or fully restricted position providing a minimum open cross section of the intake gas passage. According to one embodiment the intake gas flap is arranged within the intake gas passage. The intake gas passage and/or intake gas flap may have an at least substantially, elliptical, in particular circular, cross section.

According to one embodiment the assembly includes a movable exhaust gas flap for continuously and/or variably changing or adjusting an effective cross section of the exhaust gas passage respectively. In other words the exhaust gas flap is movable or adjustable respectively between a most-open or fully open position providing a maximum open cross section of the exhaust gas passage, and a most-closed or fully closed position providing a minimum open cross section of the exhaust gas passage, in particular at least substantially closing the exhaust gas passage. According to one embodiment the exhaust gas flap is arranged within the exhaust gas passage. The exhaust gas passage and/or exhaust gas flap may have a substantially elliptical or circular cross section.

According to one aspect of the present disclosure the intake gas flap includes a channel, in particular through-hole, connecting an inlet port on an upstream-side surface of the flap with an outlet port on a downstream-side surface of the flap. The intake gas flap may include a plurality of channels, in particular through-holes, for example, at least two or four or six channels, connecting a plurality of inlet ports on the upstream-side surface with a plurality of outlet ports on the downstream-side surface.

According to one embodiment such channels may advantageously reduce a disturbance within the intake gas passage induced by the intake gas flap, thereby improving performance of an internal combustion engine with an EGR system including the EGR valve assembly. According to one embodiment such channels may in particular advantageously reduce formation of water condensate downstream of the intake gas flap.

According to one embodiment, each of the channels have a slot or elongated cross section respectively. According to one embodiment such slotted intake gas flap reduces advantageously disturbance within the intake gas passage. According to one embodiment the slots are orientated at least substantially parallel with one another. According to one embodiment such parallel slotted intake gas flap further reduces disturbance within the intake gas passage.

According to one embodiment, the channels extend within or inside a portion or region (e.g., diameter) of an intake cross section. For example, the portion or region respectively may be at least 10%, in particular at least 25%, in particular at least 50%, in particular at least 75% of the cross section. According to one embodiment such minimum length reduces disturbance within the intake gas passage.

Additionally or alternatively the channels extend within or inside a portion of an intake cross section, in particular diameter, or region of the intake gas flap respectively. The portion or region respectively is at most 90%, in particular at most 75%, in particular at most 50%, in particular at most 25% of the cross section, in particular diameter. According to one embodiment such maximum length reduces disturbance within the intake gas passage.

Additionally or alternatively the channels extend within or inside a portion of an intake cross section, in particular diameter, or region of the intake gas flap respectively. The portion or region excludes or does not include respectively an exhaust gas intake passage-side end of at least 10%, in particular of at least 25%, in particular of at least 50%, of the cross section, in particular diameter. In other words, the channels do not extend into an exhaust gas intake passage-side region of the intake gas flap which is at least 10% or 25% or 50% of the cross section, in particular diameter, of the flap. Yet in other words an exhaust gas intake passage-side region of at least 10% or 25% or 50% of the flap (cross section, in particular diameter) may be free of channels. According to one embodiment such restriction reduces disturbance within the intake gas passage.

Additionally or alternatively the channels extend within or inside a portion of an intake cross section, in particular diameter, or region of the intake gas flap respectively. The portion or region excludes or does not include respectively an exhaust gas intake passage-opposed end of at least 10%, in particular of at least 25%, in particular of at least 50%, of the cross section, in particular diameter. In other words one or more, in particular all channels do not extend into an exhaust gas intake passage-opposed region of the intake gas flap which is at least 10% or 25% or 50% of the cross section, in particular diameter of the flap. Yet in other words an exhaust gas intake passage-opposed region of at least 10% or 25% or 50% of the flap may be free of channels. According to one embodiment such restriction improves mixture between intake and exhaust gas downstream of the intake gas flap and/or reduces the disturbance created by the flap into the intake air.

According to one embodiment the channels have a minimum cross section of at least 0.1%, in particular at least 0.5%, in particular at least 1% minimum cross section of the intake gas flap. Additionally or alternatively the channels have a minimum cross section of at most 10%, in particular at most 5%, in particular at most 1% minimum cross section of the intake gas flap. According to one embodiment such minimum and/or maximum channel cross section reduces disturbance within the intake gas passage.

According to one embodiment, the intake gas flap is hinged rotatably around a rotational axis. According to one embodiment this allows compact and/or simple construction, actuation and/or sealing. According to another embodiment the intake gas flap is slidably along a sliding axis.

According to one embodiment, an angle between the rotational axis and a longitudinal axis of the intake gas passage is within 80° and 100°, and may in particular be at least substantially 90°. In other words the rotational axis may be at least substantially parallel to across section of the intake gas passage. According to one embodiment, an angle between the rotational axis and a longitudinal axis of the exhaust gas passage branching into the intake gas passage may also be within 80° and 100°, and in particular at least substantially 90°. In other words the rotational axis may be at least substantially parallel to an intake gas passage-side end of the exhaust gas passage. According to one embodiment such orientation of the rotational axis reduces disturbance within the intake gas passage.

According to one embodiment the slots of the intake gas flap are orientated at least substantially perpendicular or parallel to the rotational axis of the intake gas flap. According to one embodiment such slotted intake gas flap improves mixture between intake and exhaust gas downstream of the intake gas flap and/or reduces the disturbance created by the flap into the intake air.

According to one embodiment, the intake and exhaust gas flap are coupled with one another, and are preferably mechanically coupled. The flaps may in particular be coupled such that an increase of an effective cross section of the exhaust gas passage by (further) opening the exhaust gas flap decreases an effective cross section of the intake gas passage by (further) closing the intake gas flap. Due to such coupling, the intake and exhaust gas flap may be arranged near to one another. Then a disturbance induced by the intake gas flap in particular may impair mixture and/or flow of the exhaust gas and/or intake and exhaust gas mixture. Thus, reducing such disturbance by an intake gas flap as described herein may in particular be advantageous with such coupled intake and exhaust gas flaps. Such EGR valve assembly with coupled intake and exhaust gas flaps may also be called a 3-way EGR valve.

According to one embodiment the EGR valve assembly includes an actuator for moving or adjusting the intake gas flap respectively. The actuator may actuate the intake gas flap and/or the exhaust gas flap coupled thereto mechanically, hydraulically, pneumatically and/or electromotorically and/or -magnetically and/or may be controlled mechanically, hydraulically, pneumatically and/or electrically.

According to one aspect of the present disclosure an internal combustion engine for a vehicle, in particular a passenger car, includes an EGR valve assembly as described herein such that an intake gas passage communicates with or is flow-connected to an intake gas conduct, respectively, and/or an exhaust gas passage communicates with or is flow-connected to an exhaust conduct respectively. The engine may in particular be a Diesel or Otto engine. According to one embodiment the internal combustion engine includes a compressor (for) compressing intake gas and in particular a turbocharger with the compressor and a turbine (adapted to be) driven by exhaust gas of the internal combustion engine for driving the compressor. According to one embodiment the exhaust conduct is downstream of the turbine. Additionally or alternatively the outlet passage of the EGR valve assembly may in particular be upstream of the compressor. In other words the EGR valve assembly may be a so-called low-pressure exhaust gas recirculation valve (assembly) ("LP-EGR"). An intake gas flap as described herein may in particular be advantageous at such LP-EGR system.

In another embodiment the compressor may be driven by a separately, in particular electrically, actuated drive, i.e. may be in particular a so-called mechanical or electrical compressor. According to one embodiment the outlet passage of the EGR valve assembly may in particular be upstream of such compressor as well.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
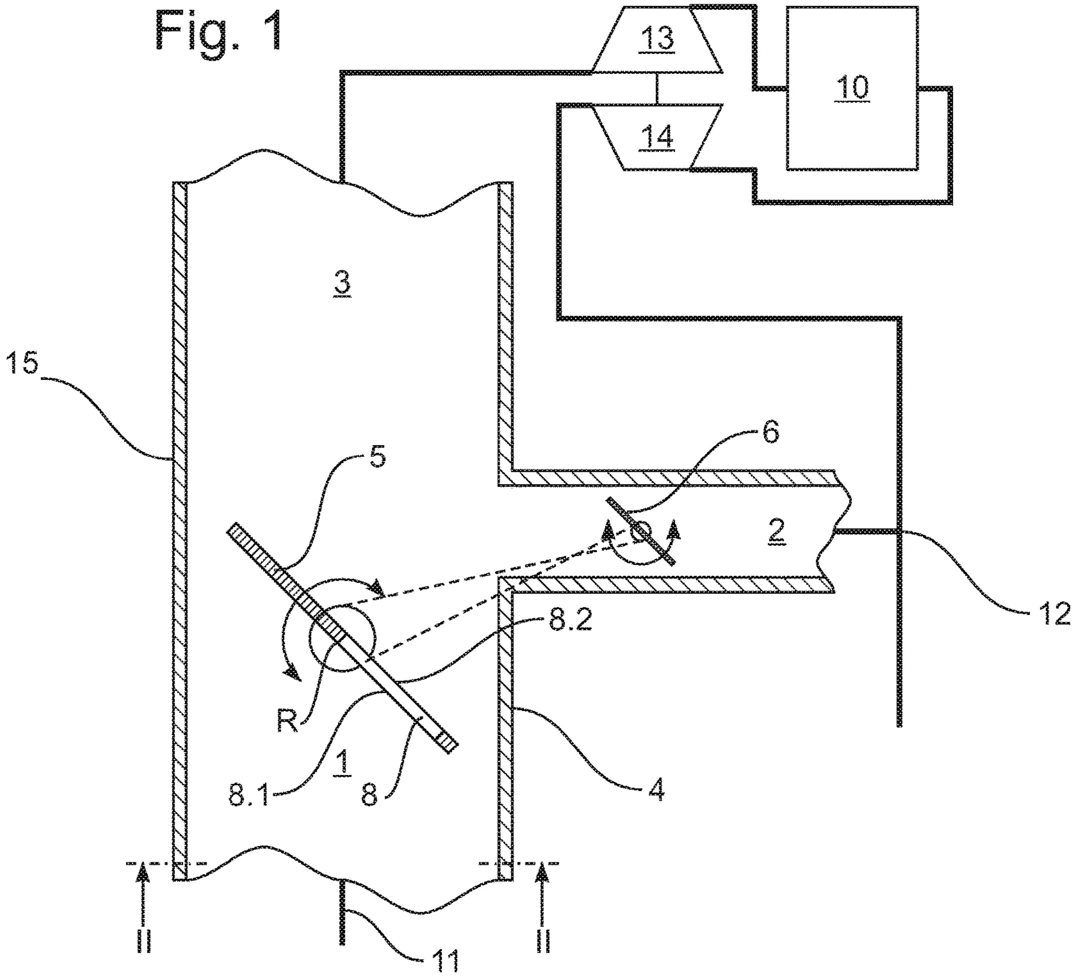
FIG. 1 shows an internal combustion engine of a car with an EGR valve assembly according to an embodiment of the present disclosure.

FIG. 1 shows, partially schematically, an internal combustion engine of a car with an EGR valve assembly according to an embodiment of the present disclosure. The internal combustion engine 10 includes a cylinder arrangement, an air intake conduct 11 for providing air to the cylinder arrangement in the engine 10, an exhaust conduct 12 for discharging exhaust gas from the cylinder arrangement in the engine 10, a turbocharger including a compressor 13 compressing intake gas and a turbine 14 driven by exhaust gas and driving the compressor 13 and an LP-EGR system having a LP-EGR valve assembly 15. The LP-EGR valve assembly 15 includes an intake air passage 1, an exhaust gas passage 2 and an outlet passage 3 which are formed within or by a common housing 4. The intake gas passage 1 communicates with the air intake conduct 11, the exhaust gas passage 2 communicates with the exhaust conduct 12 downstream of turbine 14, and the outlet passage 3 is upstream of compressor 13. The LP-EGR valve assembly includes a movable intake gas flap 5 arranged within the intake gas passage 1 which is hinged rotatably around a rotational axis R perpendicular to a longitudinal axis (vertical in FIG. 1) of the intake gas passage 1 and also parallel to across section of an intake gas passage-side end (left in FIG. 1) of the exhaust gas passage 2.

Figure 2:
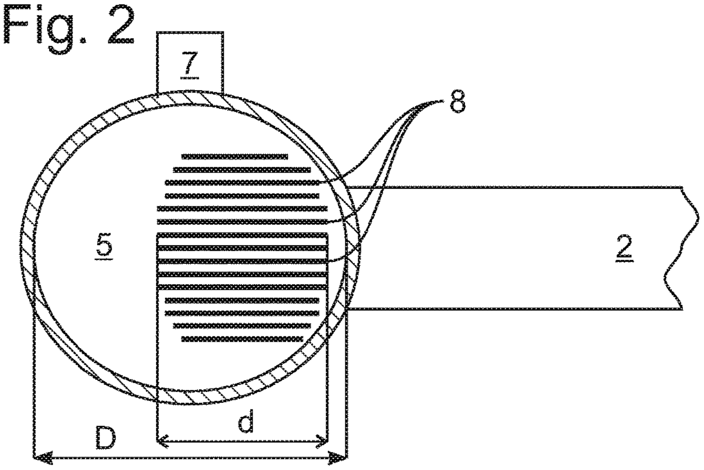
FIG. 2 is a sectional view along line II-II in FIG. 1 with an intake gas flap being moved into a closed position.

As can be seen in the sectional view of FIG. 2 intake gas passage 1 and intake gas flap 5 have an elliptical cross section. One should note that in the sectional view of FIG. 2 intake gas flap 5 is moved into a closed position while in FIG. 1 intake gas flap 5 is moved into amore opened position. The LP-EGR valve assembly further includes a movable exhaust gas flap 6 arranged within the exhaust gas passage 2 which is hinged rotatably around a rotational axis parallel to rotational axis R of the intake gas flap 5.

Intake and exhaust gas flap 5, 6 are coupled with one another mechanically as it is indicated schematically by way of example by a dashed line in FIG. 1 such that an increase of an effective cross section of the exhaust gas passage 2 by further opening the exhaust gas flap 6 decreases an effective cross section of the intake gas passage 1 by further closing the intake gas flap 5 and vice versa. Thus, moving intake gas flap 5 changes an effective cross section of intake gas passage 1 allowing through-flow of intake gas, in particular intake air, and moving exhaust gas flap 6 changes an effective cross section of exhaust gas passage 2 allowing through-flow of exhaust gas.

As illustrated in FIG. 2, the LP-EGR valve assembly further includes an actuator 7 for moving or rotating the intake gas flap 5 respectively. As can be seen in particular in FIG. 2 where intake gas flap 5 is moved to a closed position for better view, the intake gas flap 5 includes a plurality of channels 8 connecting a plurality of inlet ports 8.1 on the upstream-side surface seen in FIG. 2, bottom in FIG. 1) with a plurality of outlet ports 8.2 on the downstream-side surface (up in FIG. 1). The channels 8 each have a slot or elongated cross section respectively as can be seen in particular in FIG. 2. The slots are orientated at least substantially parallel with one another and perpendicular to the rotational axis R of the intake gas flap 5.

In the exemplary embodiment shown in FIGS. 1, 2, the channels 8 extend within a portion d of a cross section, in particular diameter, D of the intake gas flap 5, wherein the portion d is around 60% of the cross section, in particular diameter, D and excludes or does not include respectively an exhaust gas intake passage-opposed end (left in FIG. 1, 2) of around 40% of cross section, in particular diameter, D. In other words the channels do not extend into an exhaust gas intake passage-opposed region (left in FIG. 1, 2) of the intake gas flap 5 which is less than 40% of cross section, in particular diameter, D of flap 5. In particular, the portion d of cross section, in particular diameter, D may alternatively exclude or not include respectively an exhaust gas intake passage-side end (right in FIG. 1, 2) of cross section, in particular diameter, D. In other words in an alternative embodiment not shown the channels 8 then do not extend into an exhaust gas intake passage-side region (right in FIG. 1, 2) of the intake gas flap 5 but may be arranged in the intake passage-opposed region (left in FIG. 1, 2) instead.

In another alternative embodiment the portion d may be symmetrically to cross section, in particular diameter, D and be around 70-90% of cross section, in particular diameter, D for example. Additionally or alternatively channels 8 may be orientated at least substantially parallel to rotational axis R.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An EGR valve assembly comprising:

an intake gas passage having an intake cross section;

an exhaust gas passage having an exhaust cross section;

an outlet passage;

an intake gas flap movable within the intake gas passage to adjust an effective intake cross section thereof, wherein said intake gas flap has a plurality of slots that are parallel with one another, each of the plurality of slots defining an inlet port on an upstream surface of the flap and an outlet port on a downstream surface of the flap and providing fluid communication therethrough; and an exhaust gas flap movable within the exhaust gas passage to adjust an effective cross section thereof.

2. The EGR valve assembly according to claim 1, wherein the plurality of slots extends within a portion of the intake cross section, wherein said portion is at least 10% and at most 90% of said intake cross section.

3. The EGR valve assembly according to claim 1, wherein the plurality of slots extends within a portion of the intake cross section, wherein said portion is at least 25% and at most 75% of said intake cross section.

4. The EGR valve assembly according to claim 1, wherein the plurality of slots extends within a portion of the intake cross section, wherein said portion excludes an exhaust gas intake passage-side end of at least 10% of said intake cross section.

5. The EGR valve assembly according to claim 1, wherein the plurality of slots extends within a portion of the intake cross section, wherein said portion excludes an exhaust gas intake passage-opposed end of at least 10% of said cross section.

6. The EGR valve assembly according to claim 1, wherein the plurality of slots extends within a portion of the intake cross section, wherein said portion is: (i) at least 10% and at most 90% of said cross section; (ii) excludes an exhaust gas intake passage-side end of at least 10% of said cross section; and (iii) excludes an exhaust gas intake passage-opposed end of at least 10% of said cross section.

7. The EGR valve assembly according to claim 1, wherein at least one of the plurality of slots has a cross section in a range between 0.1% and 10% of a minimum cross section of the intake gas flap.

8. The EGR valve assembly according to claim 1, wherein the intake gas flap is hingedly supported for rotation around a rotational axis.

9. The EGR valve assembly according to claim 8, wherein an angle between said rotational axis and a longitudinal axis of the intake gas passage is in a range between 80° and 100°.

10. The EGR valve assembly according to claim 1, further comprising a flap coupling that is operatively attached to the intake gas flap and the exhaust gas flap, wherein said flap coupling rotatably couples said intake gas flap and exhaust gas flap with one another.

11. The EGR valve assembly according to claim 1, further comprising an actuator operably coupled to the intake gas flap for adjusting the effective intake cross section of the intake gas passage.

12. The EGR valve assembly according to claim 1, wherein the plurality of slots are perpendicular to an axis of rotation of the intake gas flap.

13. The EGR valve assembly according to claim 1, wherein different ones of the plurality of slots have different lengths.

14. The EGR valve assembly according to claim 1, wherein the plurality of slots are asymmetrically arranged on the intake gas flap with respect to an axis of rotation of the intake gas flap.

15. The EGR valve assembly according to claim 1, wherein the intake gas flap is rotatable about an axis of rotation between a first position and a second position within the intake gas passage;

wherein the intake gas flap includes a first side and a second side, the first side and the second side being disposed on opposite sides of the axis of rotation; and wherein a majority of the plurality of slots are disposed on the first side of the intake gas flap.

16. The EGR valve assembly according to claim 15, wherein, as the intake gas flap rotates from the first position to the second position, the first side is configured to advance in an upstream direction in the intake gas passage and the second side is configured to advance in a downstream direction in the intake gas passage.

17. An internal combustion engine system comprising:

an internal combustion engine with an exhaust conduct;

an intake gas passage having an intake cross section;

an exhaust gas passage having an exhaust cross section, wherein said exhaust gas passage communicates with the exhaust conduct of the internal combustion engine;

an outlet passage;

an intake gas flap movable within the intake gas passage to adjust an effective intake cross section thereof, wherein said intake gas flap has a plurality of slots that are parallel with one another, each of the plurality of slots defining an inlet port on an upstream surface of the flap and an outlet port on a downstream surface of the flap and providing fluid communication therethrough; and an exhaust gas flap movable within the exhaust gas passage to adjust an effective cross section thereof.

18. The internal combustion engine system according to claim 17, further comprising a compressor operably coupled to the intake gas passage for compressing intake gas.

19. The internal combustion engine system according to claim 18, further comprising a turbine operably coupled to the exhaust gas passage upstream of the EGR valve assembly, wherein the turbine is configured to be driven by exhaust gas and to drive said compressor.

20. An EGR valve assembly comprising:

an intake gas passage having an intake cross section;

an exhaust gas passage having an exhaust cross section;

an outlet passage;

an intake gas flap that is supported for rotation within the intake gas passage about an axis of rotation to adjust an effective intake cross section thereof, said intake gas flap having a plurality of slots that are parallel with one another and perpendicular to the axis of rotation, different ones of the plurality of slots having different lengths, the plurality of slots being asymmetrically arranged on the intake gas flap with respect to the axis of rotation, each of the plurality of slots defining an inlet port on an upstream surface of the flap and an outlet port on a downstream surface of the flap and providing fluid communication therethrough; and an exhaust gas flap movable within the exhaust gas passage to adjust an effective cross section thereof.

* * * * *